United States Patent [19]

Beaubien

[11] 3,912,638
[45] Oct. 14, 1975

[54] SCREEN FUNNEL

[75] Inventor: Everett E. Beaubien, Lake Elmo, Minn.

[73] Assignee: Twin Tool, Incorporated, St. Paul, Minn.

[22] Filed: Mar. 27, 1975

[21] Appl. No.: 562,551

Related U.S. Application Data

[63] Continuation-in-part of Ser. No. 443,392, Feb. 19, 1974, abandoned.

[52] U.S. Cl. .................................. 210/455; 210/482
[51] Int. Cl.² ......................................... B01D 35/28
[58] Field of Search .......... 210/232, 335, 337, 338, 210/339, 342, 446, 447, 448, 451, 452, 455, 457, 458, 464, 469, 473, 474, 477, 482

[56] References Cited
UNITED STATES PATENTS

| | | | |
|---|---|---|---|
| 1,230,024 | 6/1917 | Pritchard | 210/452 |
| 2,003,658 | 6/1935 | Thomas | 210/337 |
| 2,257,944 | 10/1941 | Fischbein | 210/497 |
| 3,166,003 | 1/1965 | Merson | 210/474 |
| 3,795,182 | 3/1974 | VanDamme | 210/482 |

Primary Examiner—Thomas G. Wyse
Assistant Examiner—F. F. Calvetti
Attorney, Agent, or Firm—Neil B. Schulte

[57] ABSTRACT

A plastic funnel having a truncated cone-shaped filtering element which snaps into the neck thereof so as to provide a removable, replaceable, and easily cleaned filtering medium having a smooth flow path and a large filtering area relative to the exit area of the funnel.

1 Claim, 4 Drawing Figures

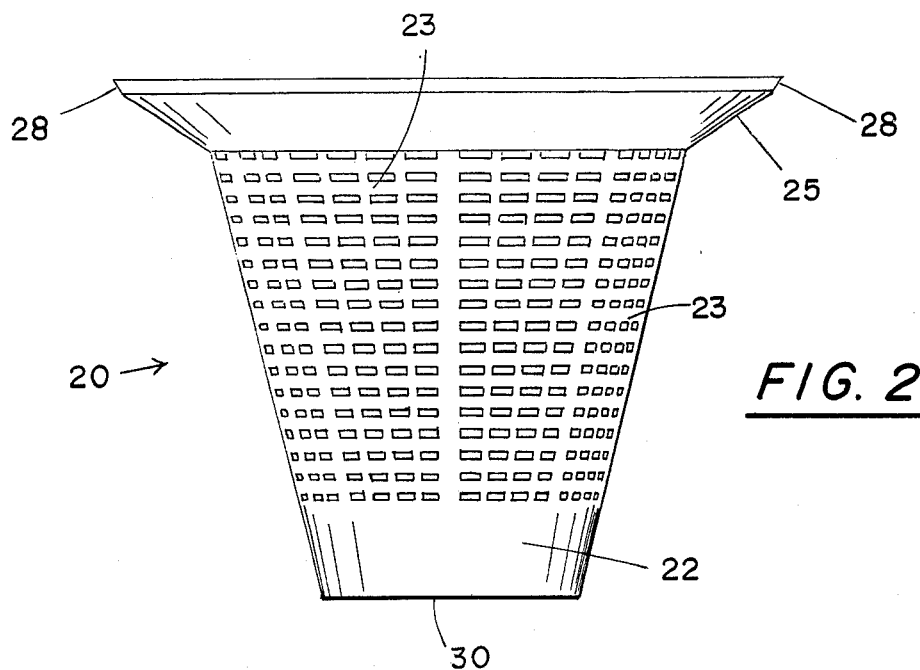
FIG. 2
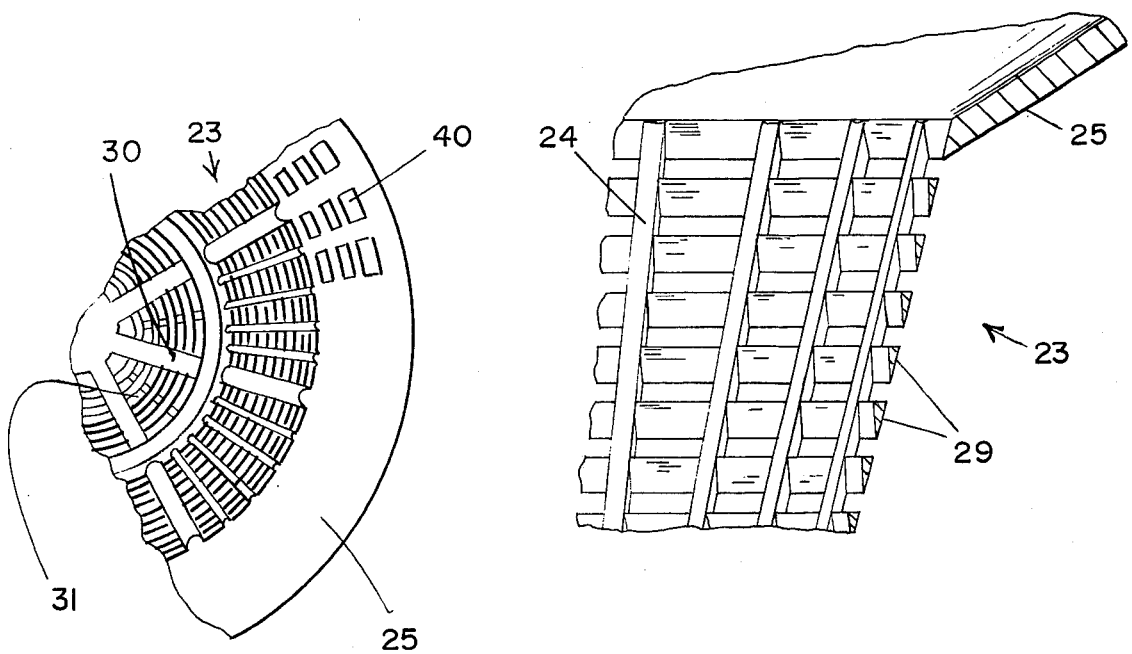
FIG. 3
FIG. 4

SCREEN FUNNEL

BACKGROUND OF THE INVENTION

This application is a continuation-in-part of my prior copending application, Ser. No. 443,392, filed Feb. 19, 1974, now abandoned.

In the prior art it is known to provide funnels having some sort of screen or filtering element incorporated therein so as to prevent unwanted sediment and contamination from passing through the funnel with the liquid being handled. Several problems are encountered with such prior art funnels. Firstly, they quickly clog with sediment requiring the entire funnel to be removed and cleaned. Because of the narrow configuration of a funnel, cleaning is difficult and time consuming. Alternatively the entire funnel and filter is sometimes thrown away as this presents an easier task than trying to clean out the small filter element. Another disadvantage arises from the fact that the prior art funnels deliver fluid quite slowly when they start to become clogged with sediment causing the transfer process to be slowed down considerably.

Still another problem with funnels of this sort is that the filters are manufactured with one given mesh size so that the funnel is only useable for one chosen filtering operation. My invention provides a new design for a funnel mounted filtering element which alleviates the problems described above.

SUMMARY OF THE INVENTION

Briefly, my invention contemplates the use of a detachable, truncated, cone-shaped filtering screen which can be snugly inserted into the conical neck of a plastic funnel. Both the funnel and the filter are generally concentric about a central axis with the entrance end of the filter disposed at an angle from the axis only slightly greater than the funnel at that point. This permits a smooth flow path from the funnel into the filter to prevent clogging and leakage. The filtering portion includes a sediment cup in the bottom and numerous filtering holes along the side walls of the cone-shaped filtering element so as to provide a large filtering area in comparison to the outlet area of the funnel. Clogging sediment passes smoothly past the funnel-filter element joint to the bottom of the cone-shaped filtering element and accumulates in the sediment cup in a position so that it does not block the main filtering area along the sides of the cone shaped filtering element. In this way, a large filtering area is maintained for a longer period of time. When the filter finally does accumulate too much sediment it can be easily snapped out and cleaned without disturbing the main body of the funnel because the filter element entrance walls are nearly parallel to the funnel walls. If the filter must be replaced it can be replaced by another small filtering element rather than having to replace the whole funnel. This is less expensive and ecologically less damaging. Furthermore, the snap-in filtering element may be made in several different mesh sizes to accommodate different liquids and different filtering operations.

Yet another advantage is found in that the filtering element provides a platform inside the funnel so that a large number of funnels can be stacked together for shipping. Since both the funnel and the filter are produced from a suitable plastic they can be made resistant to acids and petroleum products. They are also easily washable.

In the prior art, metal funnels have been unsuitable for use with flammable fluids due to the chance that the metal could produce a spark but this danger does not exist with the present invention which utilizes a safe plastic material. Also the flexibility of the plastic combined with the shape of the parts permits easy removal of the filter combined with a snug leakproof joint. Consequently, it may be seen that it is an object of my invention to provide an improved screen funnel which is more versatile, easier to remove and clean, and less expensive to convert to other filtering operations. It is an additional object of my invention to provide a screen funnel which filters faster by allowing fluid to flow through over a smooth flow path at a greater rate for a longer period of time. Additional objects and advantages will become apparent from the following description and drawings.

BRIEF DESCRIPTION OF THE DRAWINGS

FIG. 2 is an elevational side view of the truncated cone-shaped filtering element itself.

FIG. 3 is a partially cut away top view of the filtering element.

FIG. 4 is a detail side perspective view of a cut away portion of the filtering element to demonstrate the detail of construction thereof.

DESCRIPTION OF THE PREFERRED EMBODIMENT

Figure 1:
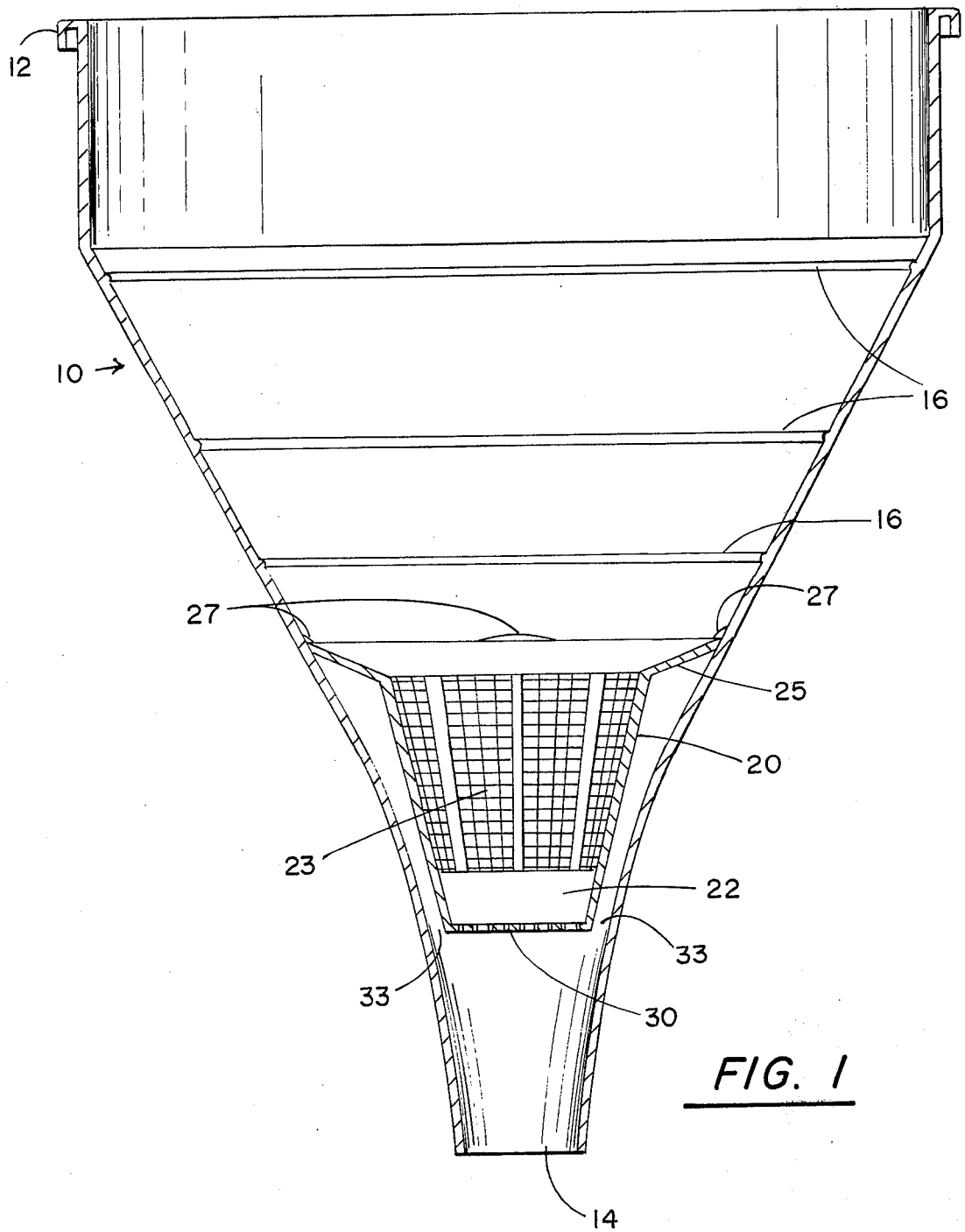
FIG. 1 is a sectional side view of the funnel showing the position of the cone-shaped filter therein.

In FIG. 1 the funnel 10 is shown in section. Funnel 10 may be molded from plastic in a manner well known to those skilled in the art and may include a rim 12, an outlet or opening 14, and suitable molded graduation rings 16 which serve as indicators of the quantity of fluid held in the funnel 10. As mentioned before, prior art screen funnels generally place some type of filtering element across outlet 14 or in a location near outlet 14. These prior art filtering elements quickly accumulate sediment which plugs the funnel. Since the filter element is often molded as a part of the funnel, this necessitates cleaning or replacing the entire funnel. In my invention these steps are not necessary because the filtering element 20 is removable.

It may seen that the filter comprises a truncated cone-shaped filtering element 20 shown in section in FIG. 1 and in elevational view in FIG. 2. Cone filter element 20 is also molded from plastic and comprises a sediment cup 22 at the bottom, an intermediate filtering area 23 along the walls and a flanged rim 25 at the top. Small protrusions 27 are molded on the interior walls of funnel 10 so that the flange 25 of the filtering element may be snapped into position underneath the protuberances 27 in a tight sealing relationship with the wall of the funnel 10. In this position filter element 20 is generally concentric about the central axis of the funnel. Since flange 25 lies at an angle to the central axis, which angle is only slightly larger than the angle between the funnel walls and the central axis, a smooth flow path into the filter is formed. Also since flange 25 is not perpendicular to the funnel walls but more nearly parallel, the flexible plastic flange 25 forms a tight seal with the funnelwalls while still being easily removable. To insure a tight seal the filtering element is provided with a small flat beveled area 28 about its upper flange 25 which is generally parallel to the walls of the interior surface of the funnel 10. The bottom, generally horizontal surface 30 of the sediment cup 20 is shown in greater detail in the top view of FIG. 3.

In FIG. 3 it may be seen that the bottom 30 of sediment cup 22 is also provided with a number of filtering holes. However, the holes 31 in the bottom 30 of the sediment cup 22 are intentionally made very small and serve to drain liquid from the sediment in the sediment cup. The primary filtering action takes place through the filtering area 23 on the conical walls of the filter element 20. As fluid passes through the funnel and into the filtering element the sediment accumulates in sediment cup 22 and does not interfere with the filtering action through the side wall area 23. As can be seen in FIG. 1 a generally clear passageway 33 is maintained between the walls of the funnel and the walls of the filter element 20 to insure the easy passage of fluid from the filtering area 23 around the sediment cup and out through opening 14.

The holes in the side of the filtering element 20, in the area 23, are intentionally designed to be larger than holes 31 in the bottom of the sediment cup 22. This encourages the flow of fluid through the side walls rather than through the bottom of the sediment cup portion. The use of a filtering element such as described in the present invention is very advantageous in providing a much larger filtering area compared to the opening 14 of the funnel 10. In the past, when the filtering elements were placed directly across outlet 14 the filtering area was approximately equal to the exit area of outlet 14. With my invention, however, the filtering area is much larger than the area of outlet 14 and therefore the flow of fluid through the funnel is unimpeded.

For an even larger flow it is possible to produce a larger filtering element 20 which would mount in the funnel at a higher location on the inner walls of funnel 10. In fact, it is readily apparent that filtering element 20 could be made almost as large as the funnel itself thus providing a cone-shaped filtering area extending down along nearly the entire length of the funnel. Such an arrangement would provide an exceptionally large filtering area relative to the area of the outlet 14 but in most applications such a large filtering element has been found to be unnecessary.

If desired, one can add additional filtering area by providing additional filtering holes in flange 25. Such holes are shown in FIG. 3 by holes 40 which are formed only in one portion of flange 25. This alternate embodiment provides additional filtering area without substantially weakening the flange 25.

In the present invention both the funnel and the filtering element 20 are molded from a suitable plastic. In the preferred embodiment polypropylene or polyethylene plastic have been used since they are easily washable and resistant to acid and petroleum products. The flexible plastic allows the filter element to spring out against the funnel under protrusions 27 to form a tight seal and yet deform sufficiently, given the angle of flange 25, to allow easy removal.

The present invention is particularly advantageous for filtering petroleum products because the plastic does not produce sparks as is the case with prior art metal funnels. The increased washability is further desirable since with the present invention the filtering element is removable and replaceable and can be cleaned separately from the funnel. Thus, the funnel can be readily used for different liquids such as paint, gas, or water because it is only necessary to change the filtering element. The filtering element may be made with different mesh size holes depending upon the application to which it is intended.

It has been found that this filter is particularly effective in filtering wine which has a large amount of sediment. The sediment is readily trapped in the sediment cup while the wine flows through the filter very quickly.

Yet another advantage of the present invention resides in the fact that once the filtering element is snapped into place, as shown in FIG. 1, it provides a slightly raised platform so that another funnel can be inserted and stacked therein without becoming tightly wedged in the lower funnel. Consequently, a number of funnels with filtering elements therein can be shipped in stacked fashion without them sticking together. Furthermore several funnels can be stacked together to from a successive series of filtering steps, the liquid passing through successively finer mesh screens so as to increase the filtering efficiency.

In the detail view of FIG. 4 it may be seen that the cone-shaped mesh area 23 is produced by molding a series of generally vertical risers 24 and a series of generally horizontal connecting straps 29 having a triangular cross eection. It is not necessary to use side core molds to produce such a configuration but rather only one outside mold and an inside mold having a stepped surface corresponding to the successive vertical surfaces of the horizontal members 29. With this molding technique it is apparent that the hole sizes can be varied as desired to produce the size mesh required for the invention.

Another embodiment of the invention may utilize a plurality of cone-shaped filtering elements mounted in a single funnel with a separate set of molded protrusions for each element and the filtering elements resting in a nested relationship. Many other variations are also possible.

I claim:

1. A screen funnel comprising first and second separable parts, the first part comprising a plastic cone shaped funnel having a central axis, a larger diameter inlet top portion disposed concentrically about said axis, a smaller diameter outlet bottom portion disposed concentrically about said axis, said inlet and outlet portions connected together to form a contained flow path by means of a tapering conical center portion having generally smooth interior walls disposed substantially at a first angle from said axis with a plurality of small protrusions disposed generally concentrically about said axis and on said smooth conical interior walls, which protrusions have top facing surfaces slanting in from the interior walls at an angle from said axis only slightly greater than said first angle so as to present a minimum flow obstruction and bottom facing surfaces slanting out from the interior walls steeply so as to retain the second part thereunder; said second part comprising a plastic filtering element shaped in the form of a truncated cone disposed generally concentrically about said axis with the filter element walls disposed at a second angle from said axis, said second angle substantially similar to said first angle so that the filter element walls are positioned generally parallel to the funnel walls at a spaced distance therefrom, said filtering element also having a conical shaped entrance end with the conical entrance walls disposed at a third angle from said axis larger than the second angle so that said entrance end walls extend from the filter element walls to the interior walls of the funnel, the largest diameter of the conical entrance end of the filtering element being substantially equal to the diameter of the funnel at the point just below said protrusions so that the filtering element fits snuggly under the protrusions and against the interior funnel walls, said entrance end beveled about the outside circumference to form a sharp edge with a conical outside surface at an angle from said axis about the same as said first angle so as to lay flatly against and form a tight seal with the interior funnel walls, and myriad perforations in the walls of the filtering element to form a liquid straining fluid passageway therethrough, said perforations excluded from the bottom portion of the filter element walls so as to form a sediment cup therein, with additional smaller perforations in the truncated portion of the filtering element to drain the sediment cup.

* * * * *